Dec. 15, 1942.  J. W. HOGUE  2,305,255
SEAM PROTECTOR
Filed July 17, 1940  4 Sheets-Sheet 1
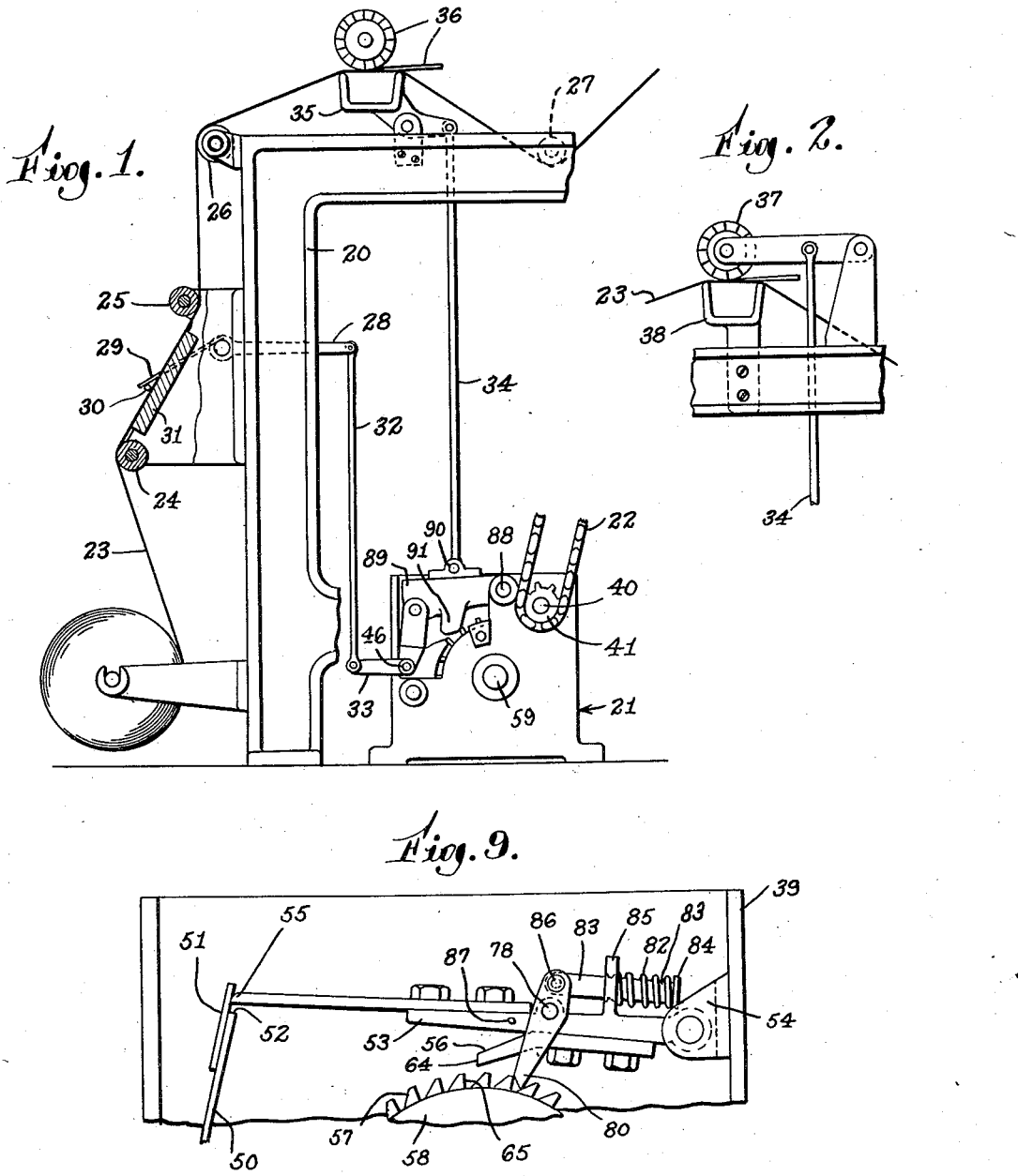
Inventor
John W. Hogue
by James L. Stewart
Attorney Dec. 15, 1942.    J. W. HOGUE    2,305,255
SEAM PROTECTOR
Filed July 17, 1940    4 Sheets-Sheet 2
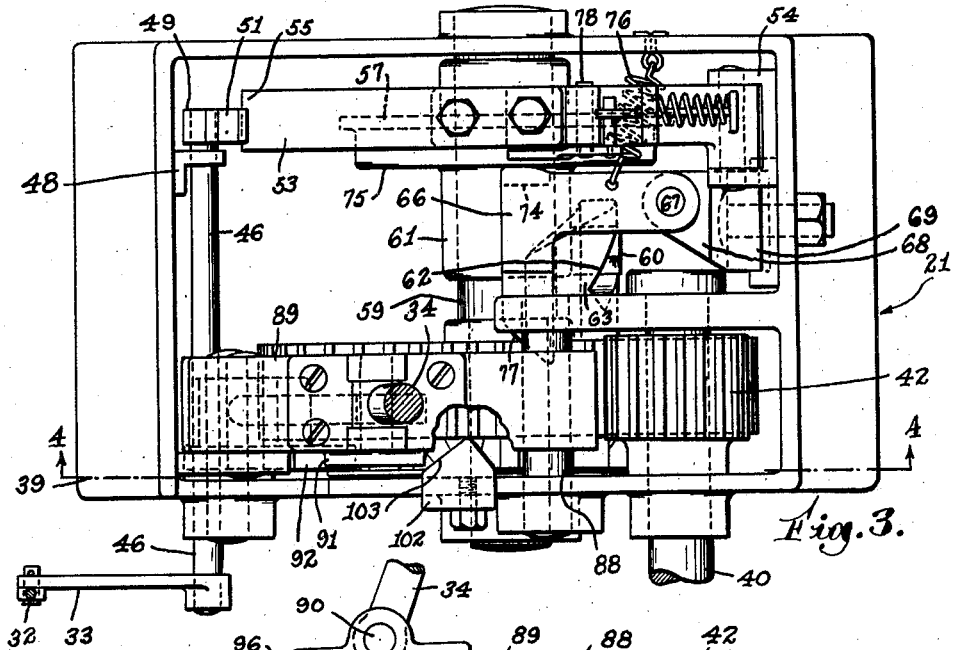
Fig. 3.
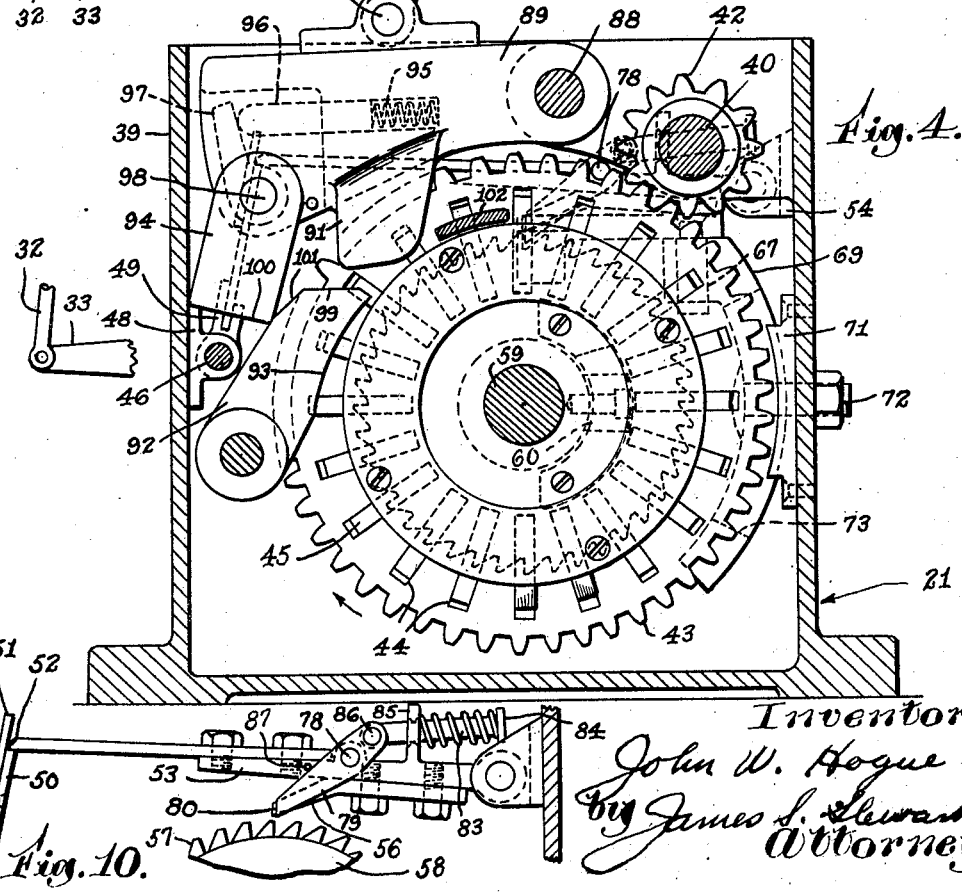
Fig. 4.
Fig. 10.
Inventor
John W. Hogue
by James S. Stewart
Attorney Dec. 15, 1942.    J. W. HOGUE    2,305,255
SEAM PROTECTOR
Filed July 17, 1940    4 Sheets-Sheet 4

Inventor
John W. Hogue
by James S. Stewart
Attorney

Patented Dec. 15, 1942

2,305,255

UNITED STATES PATENT OFFICE 2,305,255

SEAM PROTECTOR

John W. Hogue, Springfield, Vt., assignor to Parks & Woolson Machine Company, Springfield, Vt., a corporation of Vermont Application July 17, 1940, Serial No. 345,900

19 Claims. (Cl. 26—17)

This invention relates to machines for shearing cloth wherein the cropping or shearing of the cloth is brought about by shearing couples consisting of fly and ledger blades in cooperation with cloth rests over which the cloth travels to present its nap or surface threads to the shearing couples and has as its special object the automatic protection of the cloth and shearing couples during the passage of a seam, wrinkle or thickened or obstructed part of the cloth's surface.

As is well known in the art, when pieces of cloth are put through a shearing machine, to crop or shear the nap, it is customary to sew together, end to end, numerous pieces of cloth which are fed through the cloth shearing machine as a continuous strip. This requires, in the usual machine, some provision for preventing the shear blades from cutting the seamed ends which, by reason of their extra thickness, would be forced by the rests into tight engagement with the shearing couple, especially the fly blade, with great danger that the latter may be injured in addition to the injury to the cloth. The common seam protecting arrangement of a cloth shearing machine includes some type of feeler mechanism which engages the cloth in advance of the shear line of the shearing couple, the feeler controlling the operation of mechanism which operates to effect a separation of the shearing couple, especially the fly blade, from the cloth rest during the time that the seam is passing through the shearing zone. This separation of the shearing couple from the cloth rest is sometimes brought about by movement of the rest away from the shearing couple and sometimes by movement of the shearing couple, especially the fly blade, away from the rest.

One of the great difficulties in the prior types of feeler controlled seam protecting devices resides in the fact that they are generally designed to go through a cycle of operations initiated by the feeler wherein separation of the shearing couple from the cloth rest is effected far enough in advance of the passage of a seam and is of sufficient duration that the seam may reach and entirely pass through the shearing zone while the shearing couple and its cooperating cloth rest remain in inoperative position. When once the cycle of operations initiated by the feeler is started it must continue until the cycle is completed. Obviously when a lump or bunch occurs on one of the pieces of cloth intermediate its ends a cycle of operations suitable for protecting a seam will leave an unduly wide uncropped area on the cloth's surface. Again if the bunch occurs a short distance in advance of a seam the cycle of operations may be such that it will be completed and the shearing couple and cloth rest restored to operative position just as the seam is passing through the shear line with resulting injury to the cloth and danger of injury to the fly blade. Furthermore a cycle of operations suitable for seams is not at all suitable for taking care of wrinkles, especially longitudinal wrinkles, nor even seams which pass through the machine in diagonal position.

The principal object of the present invention is to bring about a form of feeler controlled mechanism for effecting separation of a shearing couple and a rest, or otherwise interrupting the shearing action of a cloth shearing machine, wherein the cycle of operations is more flexible than heretofore possible and wherein the mechanism is capable of automatically adjusting itself to the character of the obstruction or the like in or on the cloth with which the feeler comes into engagement.

From another aspect the object of the invention is to bring about a form of feeler controlled mechanism for interrupting the shearing action of a cloth shearing machine wherein the cloth and shearing couple are not only protected against injury but wherein a greater percentage of the cloth's surface may be sheared or cropped than has heretofore been possible.

To these and other ends, the invention consists in the novel features and combinations of parts to be hereinafter described and claimed.

In the drawings,

Fig. 1 is a side elevational view somewhat diagrammatic and broken away of a cloth shearing machine having the improved seam protecting device embodied therein;

Fig. 2 is a view similar to Fig. 1 but showing another method of interrupting the shearing, the machine being broken away for the most part;

Fig. 3 is a plan view of the feeler controlled seam protecting mechanism per se;

Fig. 4 is a sectional view taken along line 4—4 of Fig. 3;

Figs. 9 and 10 are detail views of a part of the mechanism to be hereinafter fully described.

Figures 5, 6:
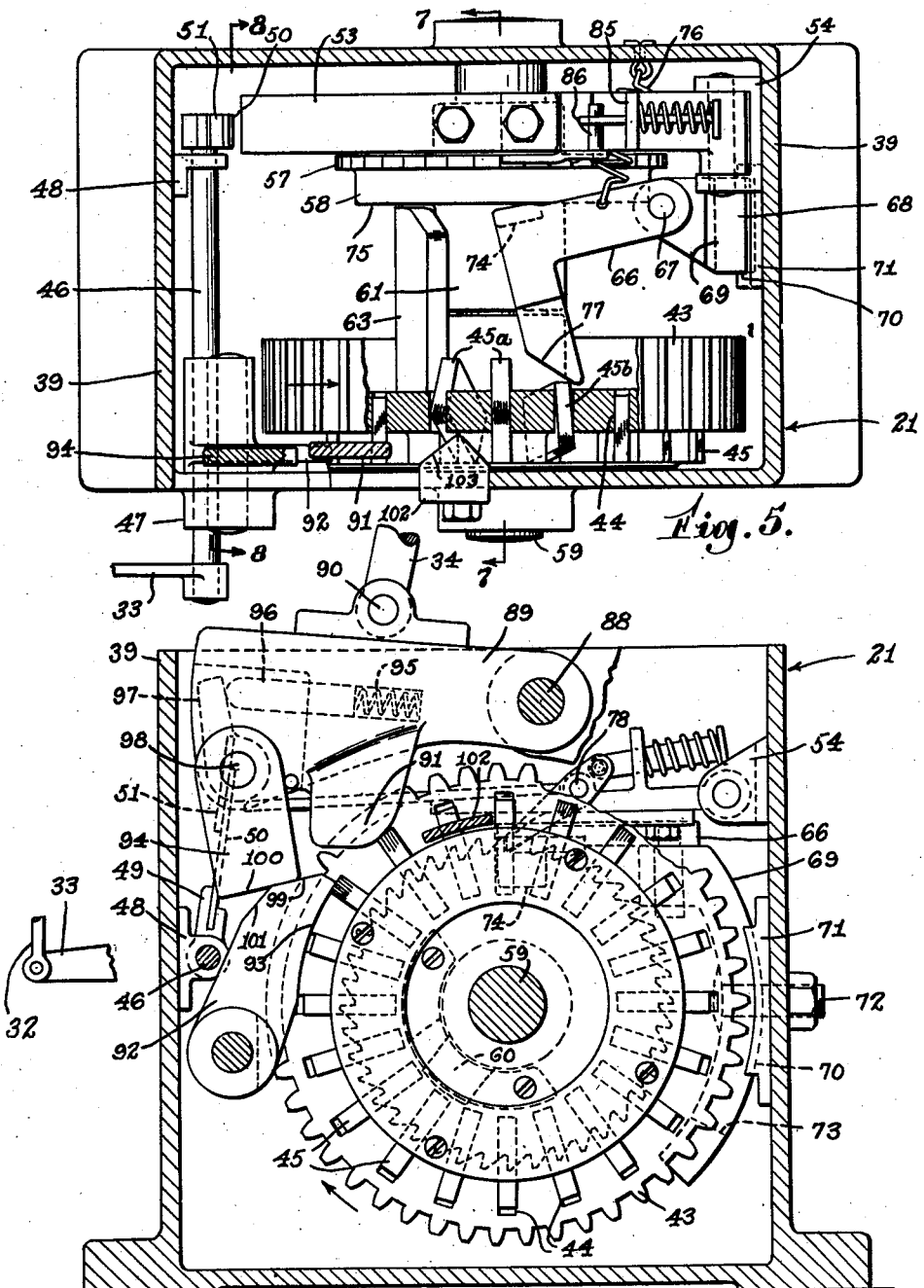
Fig. 5 is a view similar to Fig. 3 but showing the parts in a different position during the actuation of the mechanism.
Fig. 6 is a view similar to Fig. 4 but showing the parts in a different position during the actuation of the mechanism.

As the seam protecting mechanism to which the invention relates is capable of a wide variety of uses or applications in cloth shearing machines and is not limited to any specific arrangement of the other and previously known and well understood parts of the cloth shearing machine, I do not attempt to show or describe herein those elements which are common to cloth shearing machines and which may be readily supplied by those skilled in the art. However, for the purpose of showing in a general way how the feeler controlled mechanism of the invention cooperates with the common parts of the machine there is shown in Figs. 1 and 2 of the drawings, somewhat diagrammatically, a cloth shearing machine having a frame 20 with which the seam protecting mechanism of the invention is associated, the latter being designated in general by the reference numeral 21, the seam protecting mechanism being driven by a chain 22, in turn driven from a suitable part of the shearing machine so as to be synchronized with the movement of the cloth 23 over the feed and guide rolls 24, 25, 26 and 27.

Mounted on the frame 20 for pivotal movement about a transverse axis parallel to the surface of the cloth 23 is a lever 28 having a pair of spaced arms 29 between which the cloth passes, the arms 29 having mounted thereon a transversely extending rod 30 which rides on the outer surface of the cloth and presses it lightly against the face of the cloth rest 31. Obviously seams or other thickened parts of the cloth will cause the rod 30 to move outwardly away from the rest 31, movement of the rod swinging the lever 28 about its axis and, through the link 32, effecting downward movement of the lever 33 of the seam protecting mechanism. Movement of lever 33 initiates a cycle of operations in the seam protecting mechanism, which cycle will be fully described hereinafter, and which brings about upward movement of the link 34 to swing gap rest 35 downwardly away from the shearing couple 36, the time and duration of separation of gap rest 35 from shearing couple 36 depending on the character of movement of the lever 33, as will be pointed out hereinafter. Alternatively upward movement of the link 34 (Fig. 2) may cause the fly blade 37 to move upwardly away from the gap rest 38, in either case the shearing of the cloth being interrupted. In so far as the further description of the invention is concerned it will be understood that lever 33 is feeler controlled while link 34 forms the connection between the seam protecting mechanism and the specific arrangement embodied in the cloth shearing machine for interrupting the shearing action.

The feeler controlled seam protecting mechanism, generally designated by the numeral 21, includes a frame 39, forming a support for the several parts of the mechanism, a shaft 40, mounted in suitable bearings on the frame, being driven continuously by chain 22 through sprocket 41, the shaft carrying a pinion thereon, indicated by the numeral 42, the pinion meshing with and continuously and uniformly driving the gear 43. The gear 43 is provided with a series of uniformly spaced radial slots or pockets 44, of generally rectangular cross-sectional shape, each pocket having mounted therein for sliding pivotal movement a rectangular pawl or tumbler 45. The pawls are normally tilted inwardly at their outer ends at an angle of about 30°, as shown at 45a in Figs. 5 and 7, and in this position are inoperative.

Figure 7:
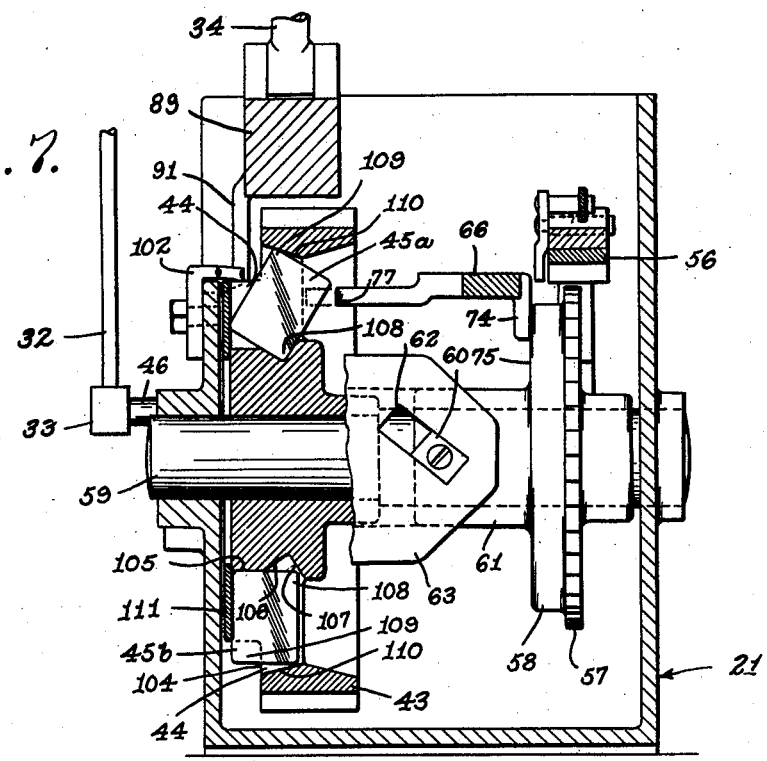
Fig. 7 is a sectional view taken along line 7—7 of Fig. 5.
Figure 8:
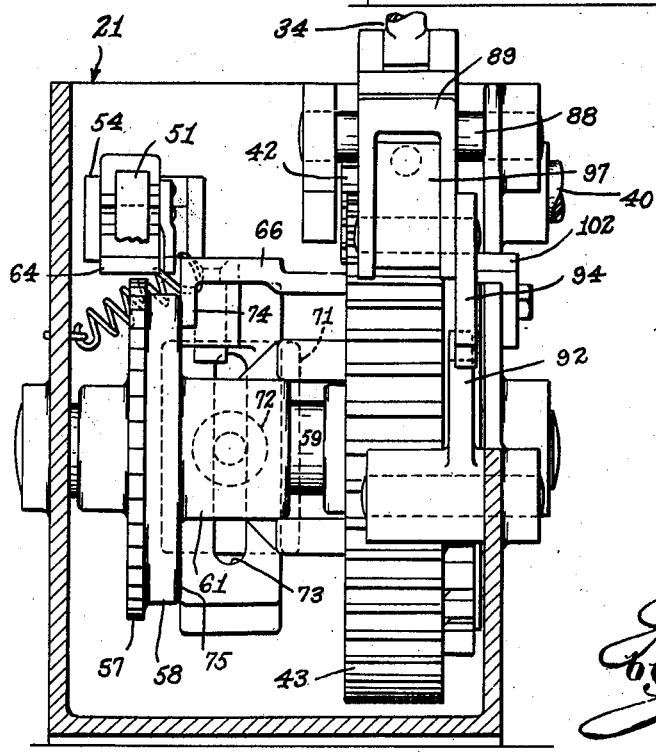
Fig. 8 is a sectional view along line 8—8 of Fig. 5.

The lever 33 is secured on the external end of shaft 46, the latter being journalled in frame 39 at 47 and in bracket 48, an upwardly extending latch arm 49 being secured on the inner end of the shaft. Mounted on arm 49 is an upwardly extending finger 50, having an overlapping extension 51, the end of finger 50, as at 52, forming a latching shoulder. An arm 53 pivotally supported on bracket 54, secured to the frame 39 at the upper end thereof on the side opposite the latching shoulder, is normally held against downward swinging movement by engagement of its outer free end 55 with the shoulder 52 but upon movement of the arm 49, by the feeler, is released to swing downwardly by gravity thus bringing the dog 56, rigidly fixed on arm 53, into engagement with the teeth 57 of ratchet 58. The ratchet 58 is mounted on shaft 59, on which the gear 43 is likewise mounted, ratchet 58 being driven by gear 43 through the cam follower 60 which in turn is attached to ratchet hub 61 and carried in the diagonal cam slot 62 formed in the bracket 63, the latter being attached to gear 43 and extending towards the ratchet (Fig. 7). Upon engagement of the end 64, of dog 56 (Fig. 9), with one of the radial faces 65, of the teeth 57, rotation of the ratchet is arrested and, as the gear 43 continues to rotate, the sides of the cam slot 62 force the cam follower 60 to move along the slot towards the gear 43, thus producing axial movement of the ratchet along the shaft 59 towards the gear 43.

Mounted between the ratchet 58 and the gear 43 is a cam arm 66, of generally L-shape, cam arm 66 having at one end a downwardly extending cylindrical stem 67, supported for movement about its axis in the upper end of cam bracket 68, the latter having an outer face 69, of cylindrical contour generated about the axis of shaft 59 and seated in the bottom of arcuate groove 70, in the seat 71, secured on the side wall of the frame 39. A bolt 72 passes through the frame 39, seat 70, and through a circumferentially directed slot 73 in the cam arm bracket and, in loose condition, permits the adjustment of the cam bracket and thus the cam arm 66 circumferentially of the shaft 59, for a purpose to be hereinafter described, the bolt being tightened to hold the cam bracket rigidly against movement after adjustment.

The flange 74, on cam arm 66, is maintained in contact with the inner face 75, of ratchet 58, by tension spring 76, one end of which is attached to the cam arm while the other end is attached to the frame, axial movement of the ratchet by the cam 62 swinging the cam arm 66 about its pivot 67 to bring the cam face 77, on the outer end of the cam arm, into the path of movement of the pawls 45 which are forced to move by the cam face, during the continued rotation of the gear 43, into a radial position, as indicated at 45b, of Fig. 5, this being the operative position of the pawls.

Mounted for pivotal movement on pin or stud 78, rigidly attached to or in arm 53 and extending outwardly therefrom towards the gear 43, is a dog 79, having its outer free end 80 normally held in alignment with the end of dog 56 by resilient means, such as spring 82. In this instance the spring 82 is received between the head 84 of rod 83 and the upstanding flange 85 on arm 58, the rod 83 passing through the spring and flange to be pivotally attached to the dog 79 by means of pivot stud 86. A stop pin 87, on the arm 58, limits the movement of the dog 79 by the spring to position the end of the dog 79 in alignment with the end of dog 56. The axial movement of the ratchet 58, by cam 62, first brings any tooth 57 which happens to be in engagement with the end of dog 56, into engagement with the end 80, of dog 79, continued movement of the ratchet freeing the tooth from contact with the dog 56. The ratchet is now free to rotate with the gear 43 which rotation of the ratchet effects swinging movement of the dog or pawl 79 about its pivot 78, as shown particularly in Fig. 9, the motion of the dog 79 reacting to swing the arm 53 upwardly until the ratchet clears the dog 56, whereupon the cam arm 66, actuated by its spring 76, moves the ratchet 58 axially along the shaft 59 away from the gear 43 and back into its original position. It will be apparent that the axial motion of the ratchet back to its original position will effect disengagement of the dog or pawl 79 from the ratchet tooth so that the pawl may be swung back into its normal position by the spring 82. As soon as the arm 53 is free from the support of the dog 79 the arm may fall back to bring the dog 56 into engagement with one of the ratchet teeth unless, in the meantime, the latch arm 50 has been moved by the feeler into position wherein the latch shoulder 52 engages the end of arm 53 and thus prevents downward movement of the latter. It will be understood from the above description that as long as the feeler maintains the latch arm 50, and its shoulder 52, out of the path of the arm 53, the ratchet and arm go through a repeated cycle of operations wherein the rotary motion of the ratchet is first arrested by engagement of the dog 56 with one of the ratchet teeth, whereupon the ratchet moves axially to disengage the dog 56 and effect engagement of the pawl 79 with the ratchet tooth freed from engagement with the dog 56. The ratchet then is free to rotate and return to its original position, the rotation of the ratchet swinging the pawl 79 about its pivot and reacting to swing the arm 53 back to its original position. Upon each axial movement of the ratchet towards the gear 43 the cam arm 66 is swung towards the gear to bring about engagement of its cam face 77 with the dogs 45, the number of dogs moved by the cam 66 depending partly on the shape and size of the cam face 77 and, in any case, on the duration of the time that the feeler keeps the latch shoulder 52 out of engagement with the end of arm 53.

Mounted above the gear 43 on the pivot 88, the latter being mounted in the casing 39, is an arm 89 to which the link 34 is pivotally connected, as at 90, the arm 89 having an extension 91 which overhangs the cut-away corners of radial slots 44, as in Fig. 4, the dogs 45a, that is to say the dogs which are in inoperative position, clearing the extension but the dogs 45b, which have been moved into operative position by the cam 66, engaging and camming upwardly the extension 91 as they approach the top of their orbit with rotating gear 43, to swing the arm 89 upwardly as shown in Fig. 6, and thus through the link 34, to interrupt the shearing action. In order to take care of relatively long interruptions of the shearing action, which may be necessary for example when a longitudinal wrinkle appears in the cloth, there is also mounted on the casing 39 and extending into the path of movement of the dogs 45 an arm 92, having an arcuate dog engaging face 93, the arm 92, upon being swung outwardly by the dogs, engaging and swinging outwardly a latch arm 94. Latch arm 94 is pivoted on arm 89 and is constantly urged to swing inwardly, towards the gear 43, by a spring 95 and plunger 96 both of which are mounted in arm 89, the plunger engaging a lever 97 secured to shaft 98, the latter being rotatably mounted in arm 89 and extending outwardly therefrom to receive on its outer end the latch 94. As soon as the dog 45b, which has swung the arm 92 outwardly, reaches the arm 89 the latter is swung upwardly and the latch moves, under the pressure of the spring, to bring the latch face 99 into engagement with the face 100 on arm 92 whereupon the arm 89 is held against downward movement until the arm 92 is released by the dogs at which time the arm 92 will be swung inwardly by the pressure thereon and by gravity, the latch being cammed outwardly to permit downward movement of the arm 89 as soon as the dogs have released the latter, the camming effect being produced by engagement of the end of the latch with the cam face 101 on arm 92, the several parts at this time being in the position shown in Fig. 4. It will be understood that the arm 89 effects motion of the link 34 to interrupt the shearing action and in case of opening movements of short duration the arm 92 is inoperative, that is to say, if but a single dog 45 is moved by the cam 66 the dog will reach and pass the arm 92 before it reaches the arm 89. Thus upon upward movement of the latter and subsequent release by the dog the arm 92 will not prevent the arm 89 from moving downwardly as there will at that time be no dogs acting to hold the arm 92 outwardly and thus through engagement with the latch prevent downward movement of arm 89.

A block 102 is mounted on the frame 39 between the extension 91 and the cam arm 66 and extends into the path of movement of the dogs 45, contact of the dogs in operative position with the sloping cam face 103 on the block forcing the dogs to tilt back into their inoperative position 45a.

The gear 43, in the form shown, is of reduced diameter at its outer end, as at 104, Fig. 1, to expose the outer ends of the dogs 45, when the latter have been moved into operative position 45b by the cam arm 66, the slots or dog receiving pockets 44 extending through the gear from one side to the other and having axially directed faces 105, on which the dogs are supported against the thrust of arms 89 and 92 when in operative position, the bottoms of the slots inwardly of the axially directed faces 105 sloping downwardly and then upwardly, as at 106 and 107, to receive the inner corners 108, of the dogs, when the latter are in inoperative position, the tilting of the dogs into inoperative position being limited by engagement of the outer corners 109 thereof, with the outer faces 110 of the slots, which faces slope inwardly. A plate 111 is applied to the outer end of the gear by screws to prevent axial movement of the dogs beyond the outer end of the gear.

It will be apparent to those skilled in the art that a small bunch on the surface of the cloth will cause the feeler to move outwardly away from the rest 31 for but an instant and thus will cause but a momentary release of the arm 53 by the latch shoulder 52. Thus the release of the arm 53 may be for such a short period of time as to effect movement of but a single dog 45 into operative position and the single dog will raise the arm 89 and immediately release this arm. Obviously the shearing action will be interrupted for a distance sufficient to permit the bunch to pass the shear line, say 3 or 4 inches, and will be resumed immediately thereafter. If another obstruction follows the bunch, a seam for example, the feeler will immediately release the arm 53, and, through engagement of the dog 56 with the ratchet, and the successive operation of the ratchet and cam arm 66, the dogs, as described above, will be brought into operative position to engage the arm 92 and prevent the arm 89 from dropping and closing the shearing couple and cloth rest.

The feeler engages the cloth some distance in advance of the passage of the cloth through the shearing couple and during the time that the bunch, seam or other obstruction is advancing towards the shearing zone, the dogs 45 set into operative position by the cam arm 66 are rotating with the gear 43 clockwise towards the arm 89. Obviously if the position of the cam arm 66 is advanced clockwise by use of bolt 72 and slot 73 the opening of the shearing couple and rest will occur sooner as the distance travelled by the operaitve dogs will be less. On the other hand if the cam arm 66 is moved counter-clockwise the distance travelled before lifting the arm 89 will be greater and the opening of the shearing couple delayed, the above adjustments being accomplished by loosening bolt 72 and moving the cam bracket 69 in its arcuate seat. By proper adjustment the shearing of the cloth may be carried right up to the seam or obstruction and then interrupted, and resumed within an instant after the obstruction has passed the shearing point.

While I have shown and described a preferred embodiment of my invention it will be understood that the same is not to be limited to the exact details shown but is capable of variation and modification within the spirit of the invention and scope of the appended claims.

What I claim is:

1. In a cloth shearing machine the combination of, a continuously rotating element, a plurality of movable circumferentially spaced pawls on said element, a feeler arranged so that a portion of the cloth above normal thickness will actuate the same, means controlled by the feeler for moving the pawls into operative position in accordance with the actuation of the feeler, shiftable shearing interrupting means engageable by the pawls in operative position to interrupt the shearing of the cloth and means engageable by an adjacent pawl in operative position to hold said shiftable means in shearing interrupting position.

2. In a cloth shearing machine the combination of, a continuously rotating element, a plurality of movable circumferentially spaced pawls on said element, a feeler arranged so that a portion of the cloth above normal thickness will actuate the same, means controlled by the feeler for moving the pawls into operative position in accordance with the actuation of the feeler, shiftable shearing interrupting means engageable by a pawl in operative position to interrupt the shearing of the cloth and means for preventing motion of the shiftable means out of shearing interrupting position when a second operative pawl follows the pawl actuating the shiftable means.

3. In a cloth shearing machine the combination of, a continuously rotating element, a plurality of movable pawls spaced circumferentially around said element, a feeler arranged so that a portion of the cloth above normal thickness will actuate the same, means controlled by the feeler for moving the pawls into operative position in accordance with the actuation of the feeler by the thickened portion of the cloth, shiftable shearing interrupting means including a member engageable by a pawl in operative position to interrupt the shearing of the cloth and normally inoperative means engageable by an adjacent pawl in operative position for releasably holding the member in shearing interrupting position.

4. In a cloth shearing machine the combination of, a continuously rotating element, a plurality of movable circumferentially spaced pawls on said element, a feeler arranged so that a portion of the cloth above normal thickness will actuate the same, means controlled by the feeler for moving the pawls into operative position in accordance with the actuation of the feeler by the thickened portion of the cloth, shiftable shearing interrupting means including a pivoted arm engageable by a pawl in operative position to interrupt the shearing of the cloth and a second pivoted arm adapted to be engaged by an adjacent operative pawl to hold the first arm in shearing interrupting position.

5. In a feeler controlled device for interrupting the shearing action of a cloth shearing machine when a thickened portion of the cloth is presented to the cloth shear the combination of, a continuously rotating element, a plurality of circumferentially spaced movable pawls therein, a cam mounted on said device for movement towards the element to engage and cam the pawls into operative position, means controlled by the operative pawls for interrupting the shearing action and means for moving the cam towards the pawls when the feeler is in engagement with a thickened portion of the cloth, said last named means including, a member normally rotating with the element and mounted for axial movement towards the element, feeler controlled means for arresting the rotary motion of said member and means for effecting axial movement of the member towards the element upon the arresting of the rotary movement thereof.

6. In a feeler controlled device for interrupting the shearing action of a cloth shearing machine when a thickened portion of the cloth is presented to the cloth shear the combination of, a continuously rotating element, a plurality of circumferentially spaced movable pawls therein, a cam mounted on said device for movement towards the element to engage and cam the pawls into operative position, means controlled by the operative pawls for interrupting the shearing action and means for moving the cam towards the pawls when the feeler is in engagement with a thickened portion of the cloth, said last named means including, a toothed member normally rotating with the rotating element, a latch operatively connected to the feeler, a pivoted lever normally held against movement by the latch but releasable thereby when the feeler is in contact with a thickened portion of the cloth, a dog on the lever adapted to engage one of the teeth on the member to arrest the rotary motion thereof upon release of the lever by the latch and means for effecting axial movement of the member towards the element to bring the cam into engagement with one of the pawls therein upon the arresting of the rotary movement of the member.

7. In a feeler controlled device for interrupting the shearing action of a cloth shearing machine when a thickened portion of the cloth is presented to the cloth shear the combination of, a continuously rotating element, a plurality of circumferentially spaced movable pawls therein, a cam mounted on said device for movement towards the element to engage and cam the pawls into operative position, means controlled by the operative pawls for interrupting the shearing action and means for moving the cam towards the pawls when the feeler is in engagement with a thickened portion of the cloth, said last named means including, a toothed member normally rotating with the rotating element, a latch operatively connected to the feeler, a pivoted lever normally held against movement by the latch but releasable thereby when the feeler is in contact with a thickened portion of the cloth, a dog on the lever adapted to engage one of the teeth on the member to arrest the rotary motion thereof upon release of the lever by the latch, means for effecting axial movement of the member towards the element to bring the cam into engagement with one of the pawls therein upon the arresting of the rotary motion of the member and means for swinging the lever upwardly into position to engage the latch upon motion of the member towards the element.

8. The combination referred to in claim 7 in which the last named means comprises a pawl on the lever adapted to engage the teeth on the member to swing the lever upwardly into latching position upon motion of the member towards the element.

9. In a cloth shearing machine having a shearing blade and a cloth rest, in combination, means separating the shearing blade and the cloth rest from each other including a follower, a constantly rotating element having a concentric peripheral surface adjacent the follower, a feeler actuated by a portion of the cloth above normal thickness, and means interposed between the follower and the peripheral surface by the actuation of the feeler and thus displacing the follower and separating the shearing blades and the cloth rest from each other.

10. In a cloth shearing machine having a shearing blade and a cloth rest, in combination, means separating the shearing blade and the cloth rest from each other including a follower, a constantly rotating element having a concentric peripheral surface adjacent the follower, a feeler actuated by a portion of the cloth above normal thickness, and means actuated by the feeler to extend out from such surface and camming the follower away from such surface and thus effecting separation of the shearing blade and the cloth rest from each other.

11. In a cloth shearing machine having a shearing blade and a cloth rest, in combination, means moving the shearing blade and the cloth rest away from each other, a feeler actuated by a portion of the cloth above normal thickness, and means brought into action by the feeler effecting separation of the shearing blade and the cloth rest from each other throughout an interval of travel of the cloth that is governed by the extent of the thickened portion of the cloth lengthwise of the cloth.

12. In a cloth shearing machine having a shearing blade and a cloth rest, in combination, a constantly rotating power-driven element, a feeler effecting the creation of a cam-surface on such element when the feeler is actuated by a portion of the cloth above normal thickness, and a follower operatively combined to effect separation of the shearing blade and cloth rest from each other when displaced by the cam-surface.

13. In a cloth shearing machine, in combination, means interrupting the shearing action, a constantly going power-driven element, a feeler displaced from its normal position by the passage thereby of a portion of cloth above normal thickness and whenever displaced effecting the creation of a cam-surface on such element which is proportional in its effective extent to the duration of the displacement of the feeler, and a follower displaced by the cam-surface and operatively connected with the shearing interrupting means to suspend the shearing throughout its displacement.

14. In a cloth shearing machine, in combination, means propelling, guiding, and shearing the cloth, a feeler actuated by a portion of the cloth above normal thickness at any point in the latter's width, and means continuously suspending the shearing action for a period of time equal to the duration of the actuation of the feeler.

15. In a cloth shearing machine, in combination, means propelling, guiding, and shearing the cloth, a feeler actuated by any portion of the width of the cloth above normal thickness, and means controlled by the feeler suspending the shearing action for the period of time required by the thickened portion of cloth to pass the shearing means.

16. In a cloth shearing machine, in combination, means propelling, guiding, and shearing the cloth, a feeler actuated by a portion of the cloth of greater than normal thickness, and means suspending the shearing action in response to actuation of the feeler and responding to a continuing or a second actuation of the feeler, occurring before the end of such suspension, by a prolongation of the same suspension of the shearing action.

17. In a cloth shearing machine the combination of shearing means, means for momentarily interrupting the operation of the shearing means when a thickened portion of the cloth is presented to the same and means for maintaining the shearing means in interrupted position when a second thickened portion of the cloth is presented to the interrupting means while the shearing is suspended in response to the presence of the first thickened portion.

18. In a shearing operating control device for a cloth shearing machine, the combination of a feeler arranged so that a portion of the cloth above normal thickness will actuate the same, means for interrupting the shearing of the cloth, means associated with the feeler and interrupting means for actuating the latter when the feeler is actuated and means for holding the interrupting means in shearing interrupting position when the feeler is actuated by another portion of the cloth above normal thickness while the shearing is interrupted by the first portion of abnormal thickness.

19. In a shearing operating control device for a cloth shearing machine, the combination of a feeler arranged so that a portion of the cloth above normal thickness will actuate the same, means controlled by the feeler for interrupting the shearing of the cloth in accordance with the actuation of the feeler by a thickened portion of the cloth and means for maintaining the shearing interrupting means in interrupting position when the feeler is actuated by following thickened portions of the cloth during the interruption of the shearing.

JOHN W. HOGUE.